June 17, 1941. E. A. CLEMENTZ 2,246,088
RULER ATTACHMENT FOR FACILITATING THE DRAWING OF PARALLEL LINES
Filed April 28, 1939 2 Sheets-Sheet 1
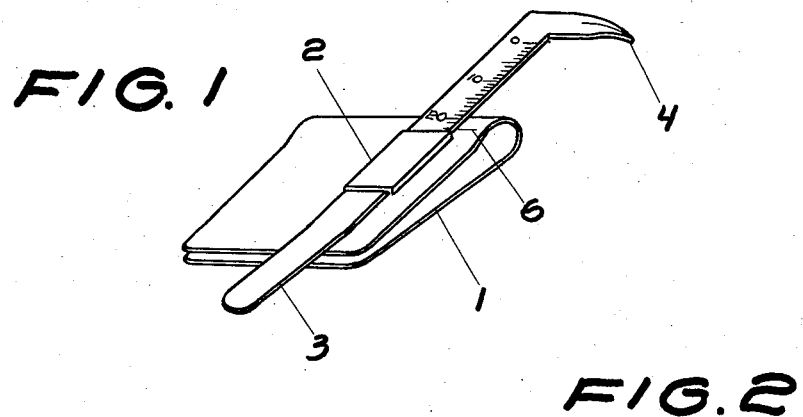
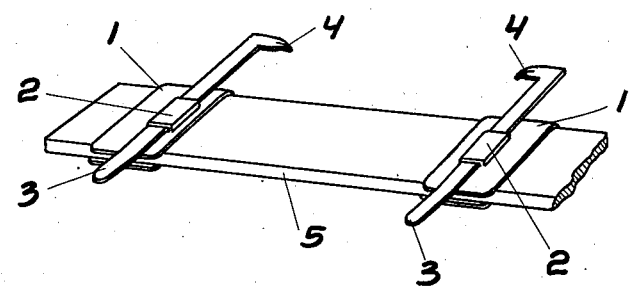
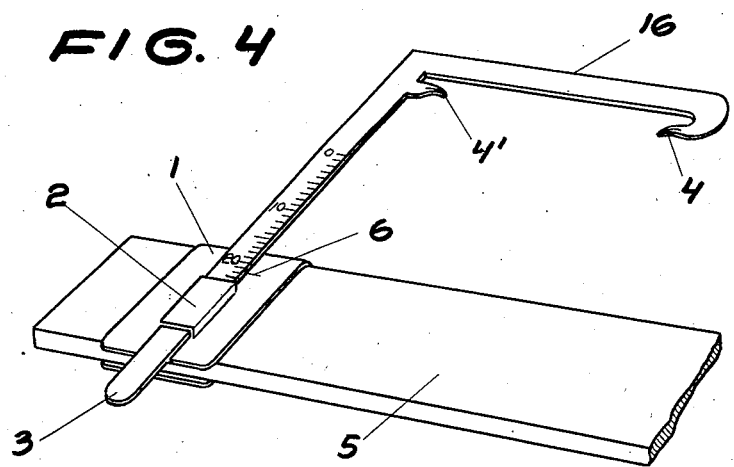
Inventor
Ernst A. Clementz Patented June 17, 1941

2,246,088

UNITED STATES PATENT OFFICE 2,246,088

RULER ATTACHMENT FOR FACILITATING THE DRAWING OF PARALLEL LINES

Ernst Alfred Clementz, Linkoping, Sweden

Application April 28, 1939, Serial No. 270,616
In Sweden April 29, 1938

2 Claims. (Cl. 33—108)

The present invention refers to a device which, when attached to a ruler, makes it possible in a simple and efficient manner to draw parallel lines at a desired distance from each other, such distance being variable at will.

The invention is described below by reference to the accompanying drawings which show three somewhat different embodiments of the same based on the same inventive idea, all of the figures in the drawings being perspective.

Fig. 1 shows an embodiment of the invention comprising a pointer supported by a graduated and slidable scale bar and adapted to be releasably and slidably mounted on the ruler by means of a spring clamp straddling the latter.

Fig. 2 is drawn to a somewhat smaller scale and shows two of the devices according to Fig. 1 mounted in place on the same ruler.

Fig. 4 shows an embodiment of the invention substantially corresponding to that shown in Fig. 1, but wherein each of the slidable scale bars serves for supporting two pointers.

Figure 3:
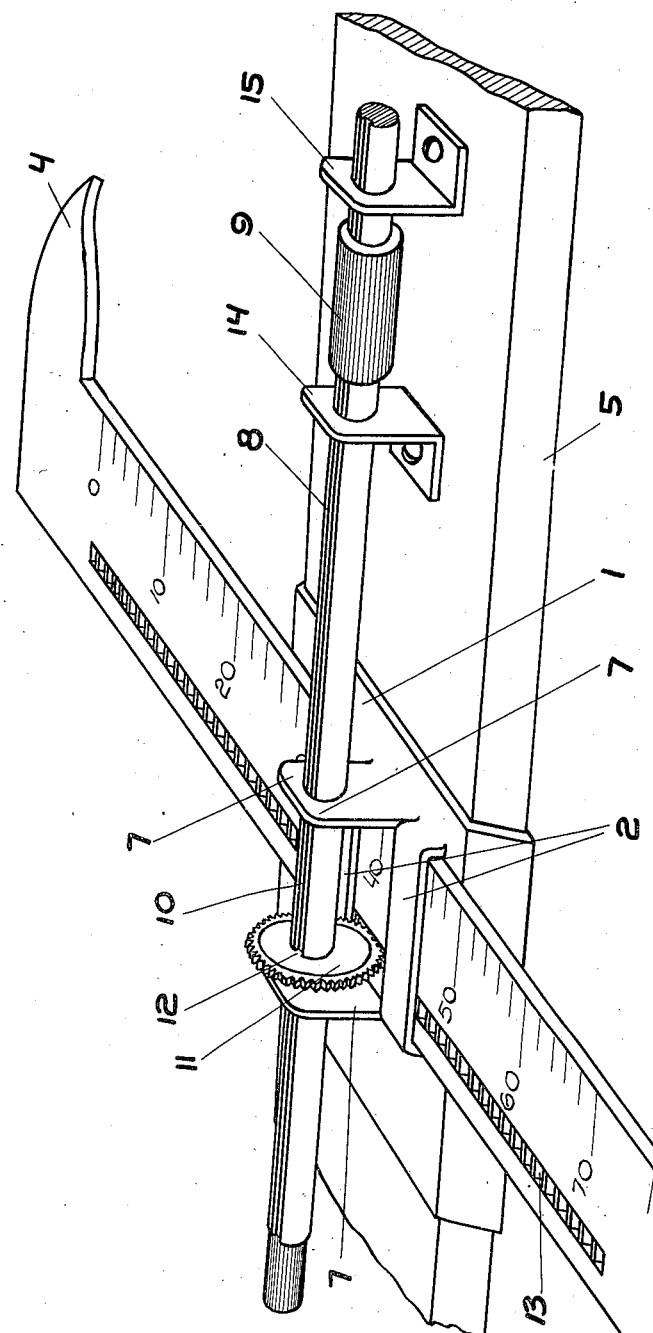
Fig. 3 shows a similar embodiment of the invention but provided with means for mechanical displacement of the pointer transversely to the ruler on which it is mounted.

In the embodiment shown in Figs. 1 and 2, the device consists of a spring clamp 1 preferably made from an elastic metal plate bent in U-shape and straddling the ruler so that it is slidable in the direction of length of the latter and may be attached thereto or dismounted therefrom by a simple manual operation and without use of a tool. The spring clamp is provided with an uppressed portion 2 having open ends and serving as a guide for a scale bar 3 one end of which is provided with a pointer 4. The scale is graduated, for instance in millimeters, and an indicator line 6 is provided on the spring clamp 1 for comparison with the graduation.

The device is intended to be used in the following manner:

Two spring clamps provided with similarly graduated scale rods 3 and pointers 4 are attached to the same ruler 5 (Fig. 2) and preferably, but not necessarily, the pointers 4 extend in a direction towards each other. The separate clamps are positioned at a distance from each other substantially corresponding to the length of the line to be drawn, and the spring clamps are pushed so far on the ruler that the edge of the same contacts with the bottom bends of the clamps. Thereafter the scale rods are slid lengthwise in their guides according to the distance between the lines to be drawn, and this distance can be read by comparison with the indicator lines. Now, a first line is drawn along the ruler which is then slid transversely so that the line drawn coincides with the pointers 4, and a second line is drawn, and so on, this line being naturally parallel with the first one and placed at the desired distance therefrom. In order as far as possible to avoid parallax, the pointers 4 are preferably bent down so as to come as close to the face to be drawn on as possible. Naturally, a line can also be drawn in any desired inclination to another if adjusting the pointers accordingly.

It is obvious that the spring clamps 1 may be substituted by some other means serving the same purpose, for instance sleeve-shaped members adapted to be slid on the ruler from the ends thereof.

By coupling both of the scale bars 3 together by some suitable mechanical means, the pointers 4 may be adjusted simultaneously and synchronously, and Fig. 3 shows an example of such an embodiment of the invention, one of the pointer supporting scale bars and its mounting means being shown in this figure only for the sake of simplicity.

The slidable attachment means 1, which in this embodiment is sleeve-shaped, is provided, besides the guides 2 for the scale bar, with two upstanding bearing lugs 7 provided with bores for a shaft 8, which preferably is somewhat longer than the ruler 5 and extends through both of the bearing bores in said lugs on the attachment sleeve 1. At its middle portion, the shaft 8 is provided with a corrugated portion 9, or the equivalent, adapted for manual rotation of the shaft, and the ruler 5 is provided with bearing lugs 14, 15 at opposite sides of this manipulation means. The shaft 8 is also provided with a longitudinal key slot 10 serving the purpose of transmitting rotation to a toothed wheel 11 mounted on the shaft between the bearing lugs 7 and provided with a key member 12 engaging said slot. In this manner the toothed wheel 11 will be slidably but non-rotatably mounted on the shaft, and it engages a toothed rack member 13 shaped in or mounted on the scale bar 3 supporting the pointer 4. Now, if two devices of this kind are coupled together by means of the shaft 8, and when rotating the latter by means of the manipulation means 9, both of the pointers 4 will be adjusted simultaneously and synchronously in relation to the ruler 5, and the pointers may be adjusted towards or from each other just as in the embodiment first described. The mechanical construction of the means for coupling together the scale bars 3 may naturally be varied within the scope of invention.

Finally, Fig. 4 shows another example for simultaneous and synchronous adjustment of two pointers, and this embodiment is very simple and efficient if the length of the lines to be drawn does not exceed a certain maximum.

According to this embodiment, the ruler 5 is provided with one single attachment means only, and this means may consist of a spring clamp 1 having a guide 2 and an indicator line 6, as described in connection with Figs. 1 and 2, but the attachment means may be constructed in another manner also in this embodiment while still serving the same purpose. In comparison with Figs. 1 and 2 the only difference is that the scale bar 3 is provided with two pointers 4 and 4' positioned at the same distance from the ruler edge and rigidly connected by means of an intermediate bar member 16. In case it is desired, the bar member 16 may also consist of two pieces mounted slidable lengthwise in relation to each other so that the distance between the pointers may be varied, one of such pieces being rigidly affixed to the scale bar, whereas the other is slidable in relation to the former.

What I claim and desire to secure by Letters Patent is:

1. In a ruler attachment of the character described, an attachment means adapted to be slidably mounted on the ruler in the direction of length of the latter, guide means provided on said attachment means and extending substantially transversely to the direction of the sliding movement of the same, a bar means slidably mounted in said guide means, graduation means provided on said bar means and adapted to be compared with an indication means provided on the attachment means, a pointer means provided on said bar means, and an intermediate bar means connected with the end of the first mentioned bar means and provided at its free end with another pointer means positioned at the same distance from the ruler edge as the first mentioned one.

2. A ruler attachment comprising a clamp adapted to slidably and frictionally engage over the edge of a ruler, with the clamp having broad bearing on the upper and lower surface of the ruler, a guide member carried by the clamp on the upper surface thereof and disposed wholly within the outline of said upper surface, a bar snugly fitted and slidably movable in the guide and bearing at all times when in the guide on the upper surface of the clamp in both directions beyond the guide, and a pointer carried by the free end of the bar and projecting laterally of the same, the free end of the pointer being down-turned.

ERNST ALFRED CLEMENTZ.